United States Patent
Chen et al.

(10) Patent No.: US 9,264,932 B2
(45) Date of Patent: Feb. 16, 2016

(54) APPLICATION-SPECIFIC TRAFFIC MULTIPLEXING

(71) Applicant: Verizon Patent and Licensing Inc., Arlington, VA (US)

(72) Inventors: Ming Chen, Bedford, MA (US); Dahai Ren, Lincoln, MA (US); Lei Zhang, Frisco, TX (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 5 days.

(21) Appl. No.: 14/279,833

(22) Filed: May 16, 2014

(65) Prior Publication Data

US 2015/0334593 A1 Nov. 19, 2015

(51) Int. Cl.
*H04L 12/26* (2006.01)
*H04W 28/02* (2009.01)

(52) U.S. Cl.
CPC .................. *H04W 28/0236* (2013.01)

(58) Field of Classification Search
CPC ............ H04W 28/02; H04W 28/0205; H04W 28/0215; H04W 28/0226; H04W 28/0231; H04W 28/0236; H04W 28/0247; H04W 28/0252; H04W 28/0268
See application file for complete search history.

(56) References Cited

U.S. PATENT DOCUMENTS

| | | | |
|---|---|---|---|
| 6,795,865 B1 * | 9/2004 | Bahl et al. | 709/235 |
| 7,859,993 B1 * | 12/2010 | Choudhury et al. | 370/217 |
| 7,904,586 B1 * | 3/2011 | Griffin et al. | 709/238 |
| 2004/0013089 A1 * | 1/2004 | Taneja | H04L 12/5695 370/235 |
| 2005/0243857 A1 * | 11/2005 | Hofstaedter et al. | 370/447 |
| 2006/0262748 A1 * | 11/2006 | Dahl | H04L 67/32 370/329 |
| 2007/0041364 A1 * | 2/2007 | Kakadia | 370/352 |
| 2007/0189169 A1 * | 8/2007 | Wu et al. | 370/235 |
| 2009/0042511 A1 * | 2/2009 | Malladi | H04L 5/023 455/62 |
| 2009/0059793 A1 * | 3/2009 | Greenberg | 370/235 |
| 2010/0272018 A1 * | 10/2010 | Furueda | H04W 36/385 370/328 |
| 2011/0211464 A1 * | 9/2011 | Chetlur | H04L 41/5067 370/252 |
| 2011/0310735 A1 * | 12/2011 | Karagiannis et al. | 370/232 |
| 2012/0057478 A1 * | 3/2012 | Brannstrom et al. | H04W 72/10 370/252 |
| 2012/0066217 A1 * | 3/2012 | Eder | G06F 17/30864 707/723 |
| 2012/0196644 A1 * | 8/2012 | Scherzer et al. | 455/524 |
| 2012/0203623 A1 * | 8/2012 | Sethi et al. | 705/14.43 |
| 2013/0223222 A1 * | 8/2013 | Kotecha et al. | 370/235 |
| 2014/0169415 A1 * | 6/2014 | Werner | H04B 7/0456 375/219 |
| 2015/0036536 A1 * | 2/2015 | Kumar et al. | 370/254 |
| 2015/0103662 A1 * | 4/2015 | Valero et al. | 370/235 |

FOREIGN PATENT DOCUMENTS

WO WO 2012080800 A1 * 6/2012

* cited by examiner

*Primary Examiner* — Kevin Mew

(57) ABSTRACT

A system may be configured to multiplex traffic, on a per-application basis, over multiple networks. The traffic may be multiplexed based on weights, associated with each application, and key performance indicators ("KPIs") associated with the networks. The system may output a first proportion of traffic, associated with the application, via a first network, and may output a second proportion of traffic, associated the application, via the second network.

20 Claims, 7 Drawing Sheets

APPLICATION-SPECIFIC TRAFFIC MULTIPLEXING

BACKGROUND

User devices, such as cellular telephones, often have the capability to communicate with multiple networks. For example, a cellular telephone may simultaneously send and/or receive traffic via a Wi-Fi network and a Long Term Evolution ("LTE") network. In some situations, different networks may provide different levels of performance. For example, a Wi-Fi network may offer lower latency, while an LTE network may offer higher throughput. Different applications may provide a better quality of experience ("QoE") to a user based on different performance factors. For example, a file transfer application may rely more heavily on higher throughput in order to provide a better QoE, while a voice call application may rely more heavily on lower latency in order to provide a better QoE.

DETAILED DESCRIPTION OF PREFERRED EMBODIMENTS

The following detailed description refers to the accompanying drawings. The same reference numbers in different drawings may identify the same or similar elements.

As provided herein, some implementations may allow for traffic, associated with applications running on a user device, to be multiplexed over multiple different networks. Specifically, for example, a user device, in some implementations, may send traffic, over multiple networks, on an application-specific basis. The manner in which the traffic is sent via the multiple networks may be based on performance characteristics of the networks.

Figure 1:
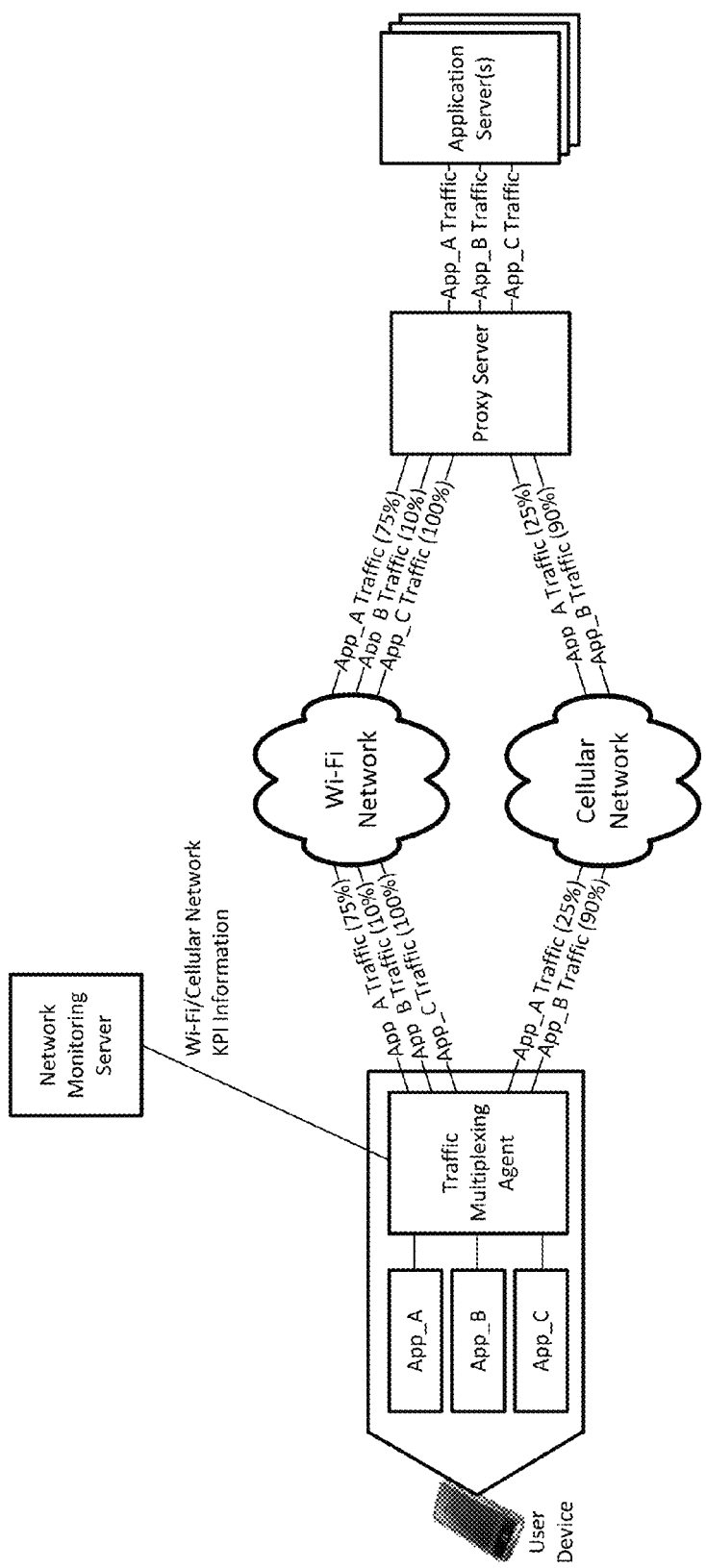
FIG. 1 illustrates an example overview of one or more implementations described herein.

For example, as shown in FIG. 1, a user device (e.g., a mobile telephone) may be capable of communicating with multiple networks (e.g., a Wi-Fi network and a cellular network). The user device may include different applications (e.g., "App_A," "App_B," and "App_C"), which may be applications that send and/or receive traffic to and/or from one or more application servers. These applications may include, for example, a voice call application, a video call application, a file transfer application, a web browsing application, a video streaming application, etc. As further shown in FIG. 1, and in accordance with some implementations, the user device may include a traffic multiplexing agent, which may multiplex traffic, associated with App_A, App_B, and/or App_C, over the Wi-Fi network and/or the cellular network.

The traffic multiplexing agent may, for example, receive information regarding key performance indicators ("KPIs") associated with the Wi-Fi network and/or the cellular network from a network monitoring server. The KPI information may include information regarding, for example, latency, throughput, packet loss, jitter, and/or other measures of performance associated with the networks. Based on the KPI information, and further based on the type of application, the traffic multiplexing agent may determine, on a per-application basis, a manner in which traffic should be multiplexed.

As shown in the example of FIG. 1, the traffic multiplexing agent may determine that 75% of the traffic associated with App_A should be sent via the Wi-Fi network, and the other 25% of the traffic associated with App_A should be sent via the cellular network. For example, App_A may be an application that benefits from low latency, and the Wi-Fi network may provide a relatively lower latency than the cellular network. Thus, the traffic multiplexing agent may determine that most (i.e., 75%, in this example) of the traffic associated with App-A should be sent via the Wi-Fi network.

In some implementations, the traffic, via the multiple networks, may be received by a proxy server. The proxy server may identify traffic, received via the multiple networks, and may forward the traffic to an application server, to which the traffic was originally intended. For example, as shown, while 75% of App_A traffic is received from the Wi-Fi network and 25% of App_A traffic is received from the cellular network, the proxy server may combine the traffic into a single logical flow, and forward the traffic to a relevant application server. The application-specific multiplexing and de-multiplexing of traffic, described herein, may enhance the experience of users, by utilizing networks that provide better performance for each application used by the users.

Figure 2:
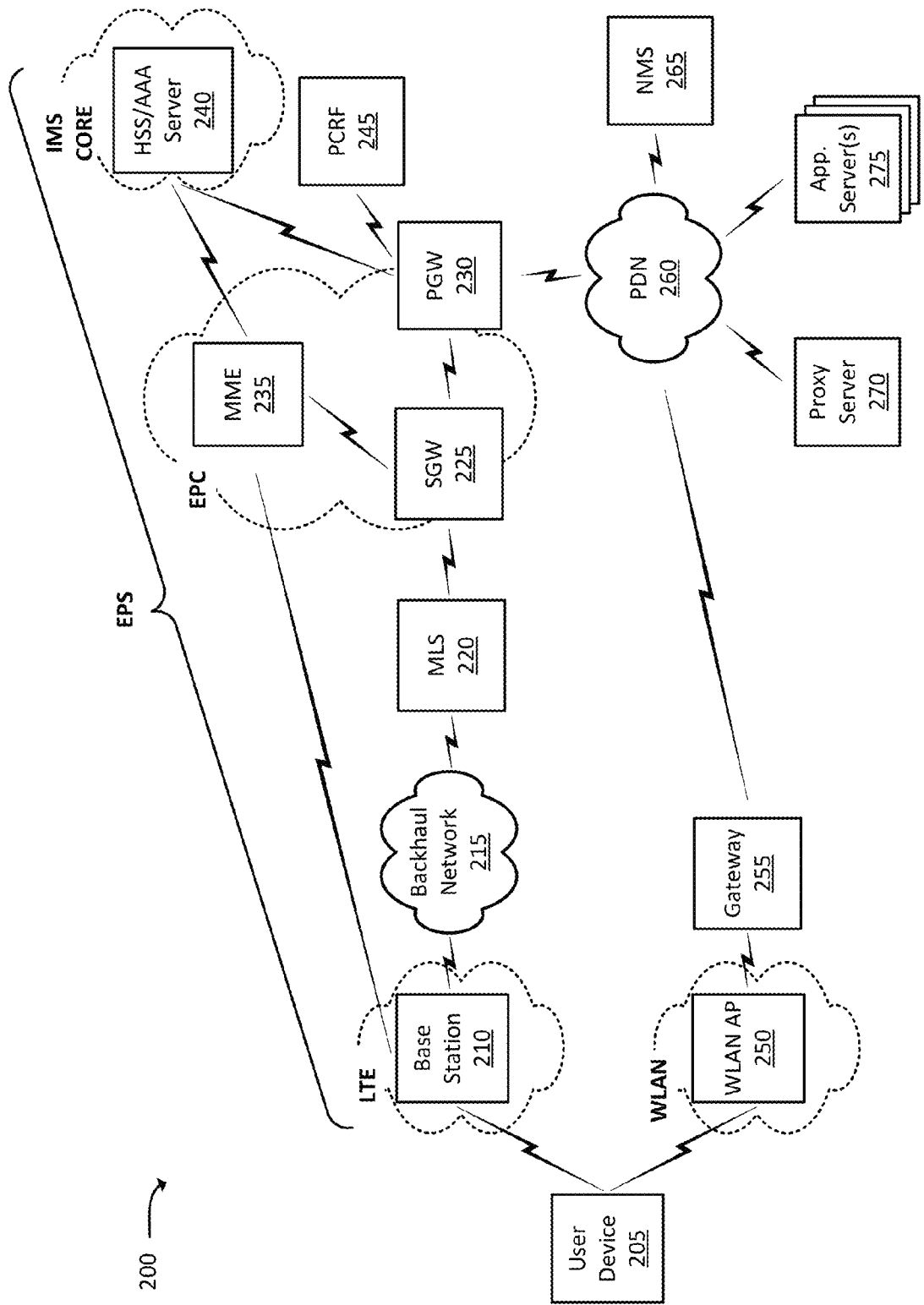
FIGS. 2 and 3 illustrate examples of one or more environments in which systems and/or methods, described herein, may be implemented.
Figure 3:
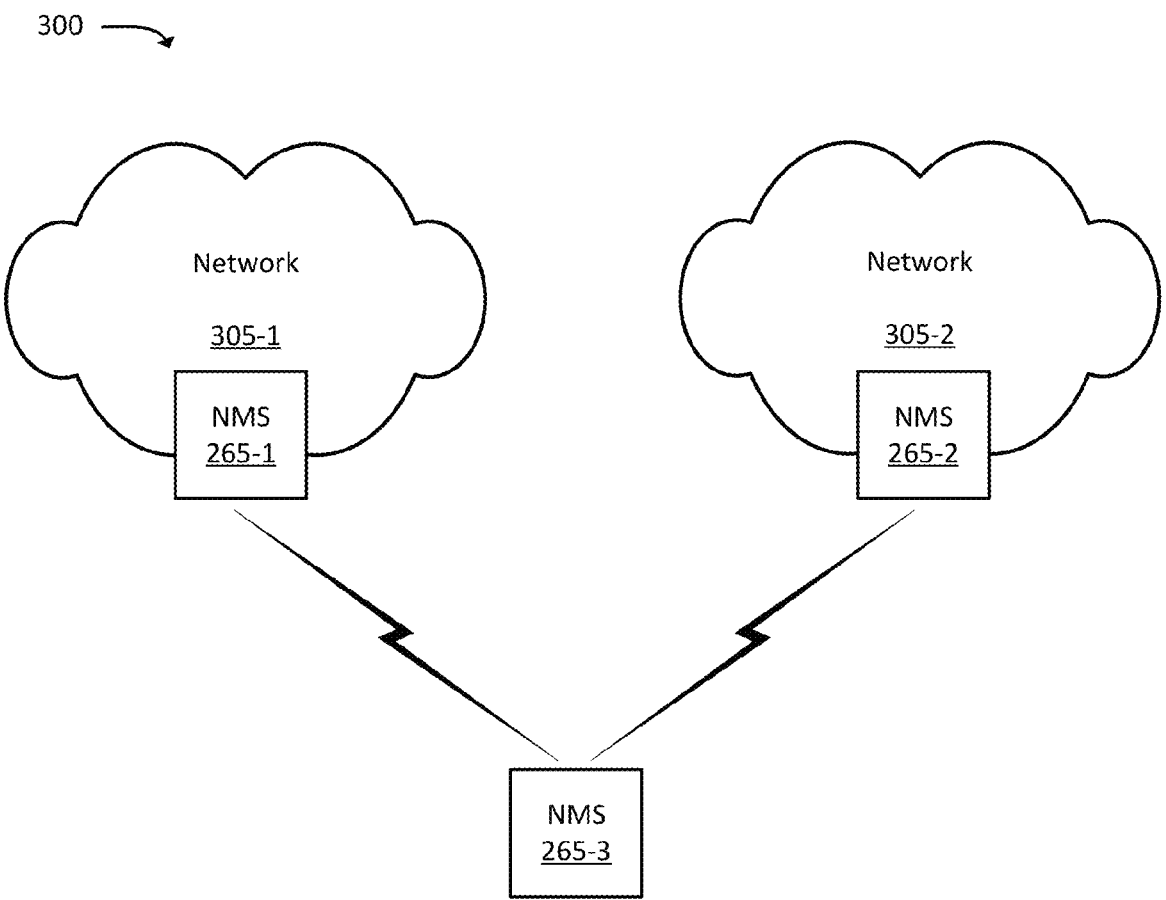

FIGS. 2 and 3 illustrate example environments 200 and 300, respectively, in which systems and/or methods described herein may be implemented. As shown in FIG. 2, environment 200 may include user device 205, base station 210, backhaul network 215, multi-layer switch ("MLS") 220, serving gateway ("SGW") 225, packet data network ("PDN") gateway ("PGW") 230, mobility management entity device ("MME") 235, home subscriber server ("HSS")/authentication, authorization, accounting ("AAA") server 240 (hereinafter referred to as "HSS/AAA server 240"), policy charging and rules function ("PCRF") 245, wireless local area network access point ("WLAN AP") 250, gateway 255, PDN 260, network monitoring server ("network management server") 265, proxy server 270, and one or more application servers ("App. server(s)") 275.

Environment 200 may include an evolved packet system ("EPS") that includes a long term evolution ("LTE") network and/or an evolved packet core ("EPC") network that operate based on a third generation partnership project ("3GPP") wireless communication standard. The LTE network may be, or may include, a radio access network ("RAN") that includes one or more base stations 210, some or all of which may take the form of an eNB, via which user device 205 may communicate with the EPC network. The EPC network may include one or more SGWs 225, PGWs 230, and/or MMEs 235, and may enable user device 205 to communicate with PDN 260 and/or an Internet protocol ("IP") multimedia subsystem ("IMS") core network. The IMS core network may include HSS/AAA server 240, and may manage authentication, session initiation, account information, a user profile, etc., associated with user device 205.

User device 205 may include any computation and communication device, such as a wireless mobile communication device that is capable of communicating with base station 210 and/or PDN 260. For example, user device 205 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device. User device 205 may send traffic to and/or receive traffic from PDN 260 via base station 210, backhaul network 215, MLS 220, SGW 225, and/or PGW 230.

Base station 210 may include one or more network devices that receive, process, and/or transmit traffic, such as calls, audio, video, text, and/or other data, destined for and/or received from user device 205. In one example, base station 210 may be an evolved Node B ("eNB") device and may be part of the LTE network. Additionally, or alternatively, one or more other base stations 210 may be associated with a RAN that is not associated with the LTE network (e.g., a wireless hot spot, a wireless access point, etc.). Base station 210 may receive traffic from and/or send traffic to application server 275 via SGW 225, PGW 230, WLAN AP 250, gateway 255, and/or PDN 260. Base station 210 may send traffic to and/or receive traffic from user device 205 via, for example, an air interface (e.g., a cellular air interface), and WLAN AP 250 may send and/or receive traffic to and/or from user device 210 via another air interface (e.g., a Wi-Fi air interface).

Backhaul network 215 may include one or more networking devices (e.g., routers and/or switches) and links (e.g., fiber or coaxial links), that connect base station 210 to a core network (e.g., a core network that includes and/or is associated with MLS 220, SGW 225, and/or PGW 230).

MLS 220 may include one or more network devices that perform switching functionality on traffic received from SGW 225 and/or backhaul network 215. MLS 220 may operate multiple layers of the Open Systems Interconnection ("OSI") reference model, in contrast with other types of switches that traditionally operate only on the Data Link Layer ("DLL"). For example, MLS 220 may perform deep packet inspection to perform routing functions.

SGW 225 may include one or more network devices that gather, process, search, store, and/or provide information in a manner described herein. SGW 225 may, for example, aggregate traffic received from one or more base stations 210 and may send the aggregated traffic to PDN 260 via PGW 230.

PGW 230 may include one or more network devices that gather, process, search, store, and/or provide information in a manner described herein. PGW 230 may aggregate traffic received from one or more SGWs 225, etc. and may send the aggregated traffic to PDN 260. PGW 230 may also, or alternatively, receive traffic from PDN 260 and may send the traffic toward user device 205 via base station 210, SGW 225, WLAN AP 250, and/or gateway 255.

MME 235 may include one or more computation and communication devices that perform operations to register user device 205 with the EPS, to establish bearer channels associated with a session with user device 205, to hand off user device 205 from the EPS to another network, to hand off user device 205 from the other network to the EPS, and/or to perform other operations. MME 235 may perform policing operations on traffic destined for and/or received from user device 205.

HSS/AAA server 240 may include one or more server devices that manage, update, and/or store, in a memory associated with HSS/AAA server 240, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber (e.g., a subscriber associated with user device 205); information regarding services to which particular subscribers are subscribed (e.g., communication services, such as video conferencing services, voice chat services, etc.); and/or other information. Additionally, or alternatively, HSS/AAA server 240 may perform authentication, authorization, and/or accounting operations associated with the subscriber and/or a communication session with user device 205.

PCRF 245 may include one or more server devices that aggregate information to and from the EPC network and/or other sources. PCRF 245 may receive information regarding policies and/or subscriptions from one or more sources, such as subscriber databases and/or from one or more users (such as, for example, an administrator associated with PCRF 245).

WLAN AP 250 may include one or more devices that receive, process, and/or transmit traffic to and/or from user device 205. WLAN AP 250 may implement, or be used to implement, a WLAN. For example, WLAN AP 250 may send traffic to and/or receive traffic from user device 205 via an air interface, and may forward traffic, associated with user device 305, to and/or from PDN 260. The air interface between user device 205 and WLAN AP 250 may correspond to a frequency band that is not associated with cellular communication (e.g., an unlicensed frequency band, which has not been licensed by a governmental entity). For instance, the air interface between user device 205 may correspond to a Wi-Fi technology (e.g., an Institute of Electrical and Electronics Engineers Institute of Electrical and Electronics Engineers ("IEEE") 802.11-based technology), a Bluetooth® technology, and/or another wireless communication technology. In some implementations, WLAN AP 250 may include, or may be associated with, a router, a switch, and/or another type of networking device.

Gateway 255 may include one or more devices that receive, process, and/or transmit traffic between WLAN AP 250 and PDN 260. For example, gateway 255 may be, and/or may include, a modem that receives signals from PDN 260 via a coaxial and/or a fiber interface, and outputs corresponding digital signals to WLAN AP 250. For example, gateway 255 may include a wired interface (e.g., an Ethernet interface) via which signals are sent to and/or received from WLAN AP 250. In some implementations, WLAN AP 250 and gateway 255 may be implemented as a single, integrated device.

Gateway 255 may, in some implementations, be provided by an Internet service provider ("ISP"), which may be the same entity as a service provider associated with base station 210. That is, in some implementations, user device 205 may receive cellular connectivity and Internet connectivity (e.g., home or office Internet connectivity) from the same entity. In some implementations, the ISP may have an agreement with the service provider associated with base station 210, whereby traffic, associated with user device 205, may be routed to or from one or more components that are shared between the various service providers (e.g., proxy server 270). Further, in implementations where the ISP and the service provider are different entities, the different entities may provide KPI information to network management server 265, and/or may provide access to network management server 265 (and/or another device) to gather KPI information regarding various networks associated with the different entities.

PDN 260 may include one or more wired and/or wireless networks. For example, PDN 260 may include a packet data network ("PDN"), such as an Internet Protocol ("IP")-based PDN. PDN 260 may include, for example, a wide area network ("WAN") such as the Internet, a core network of a telecommunications provider, a private enterprise network, and/or one or more other networks. User device 205 may connect, through PGW 230, to data servers, application servers, other user devices 205, and/or to other servers or applications that are coupled to PDN 260.

Network management server 265 may include one or more server devices that receive and/or determine KPI information regarding one or more networks and/or network devices (e.g., base station 210, MLS 220, SGW 225, and/or PGW 230), and/or from another device. In some implementations, network management server 265 may aggregate KPI information, received from multiple network devices, in order to generate information regarding traffic. For example, network management server 265 may identify an end-to-end path via which traffic to and/or from user device 205 is transmitted, and may identify measures of per-segment and/or end-to-end latency associated with the traffic.

In order to provide information to network management server 265, network devices may be associated with hardware and/or software that monitor traffics received and/or sent by network devices. This hardware and/or software may analyze monitored traffic to determine, for example, KPI information associated with a respective network devices or a link between network devices, and may provide the information to network management server 265. In some implementations, one network device may receive information from another network device, in order to determine KPI information regarding a link between the network devices. For example, a first network device may receive information from another network device regarding a particular data packet, and may determine one or more KPIs based on this information (e.g., transport latency associated with a link between the first and second network devices, packet drop rate, etc.).

In some implementations, network management server 265 may communicate with network devices over existing communication links (e.g., as shown in FIG. 2). In some implementations, network management server 265 be directly connected to one or more devices (base station 210, MLS 220, SGW 225, and/or PGW 230) via a direct connection. The data sent from network devices, to network management server 265, may be of a relatively low priority, such that this data does not preempt user data (e.g., data sent to and/or from user device 205). For example, network devices may set a priority flag, of KPI data sent to network management server 265, to be lower than a priority that is associated with user data. For instance, this priority flag may be set to a lowest possible priority. In some situations, such data may be referred to as "bulk data," or as being associated with a "scavenger class."

As described below, network management server 265 may additionally, or alternatively, generate additional weighting information for individual networks (e.g., for the LTE network and the WLAN), which may be used by user device 205 when determining how to multiplex traffic. In some implementations, the additional weighting information may be based on a location (e.g., a present location and/or a predicted future location) of user device 205.

Proxy server 270 may include one or more server devices that receive multiplexed traffic from user device 205, de-multiplex the traffic, and route the de-multiplexed traffic toward an intended destination. For example, proxy server 270 may receive traffic, intended for a particular application server 275, from user device 205, via base station 210 and WLAN AP 250. Proxy server 270 may de-multiplex the traffic (e.g., combine the traffic into a single logical traffic flow), and route the traffic toward application server 275. In some implementations, proxy server 270 may be associated with the same service provider that provides base station 210 and gateway 255. For example, as mentioned above, an ISP and a cellular telecommunications service provider may be the same entity. Alternatively, proxy server 270 may be provided by a different entity than a service provider associated with base station 210 and/or gateway 255. In some such implementations, an entity, that provides proxy server 270, may have an agreement with one or more service providers associated with base station 210 and/or gateway 255, whereby multiplexed traffic, received from user device 205 via base station 210 and gateway 255, is routed to proxy server 270. In some implementations, proxy server 270 may multiplex traffic, from application server 275, to user device 205 via multiple networks (e.g., via gateway 255 and base station 210).

Application server 275 may include one or more server devices that provide services to user device 205. For example, application server 275 may provide voice call services, video call services, chat services, gaming services, file transfer services, web browsing services, and/or other types of services. For example, an application, running on user device 205, may output traffic toward application server 275 as a single logical traffic flow, a traffic multiplexing agent running on user device 205 may multiplex the traffic and output the multiplexed traffic via multiple networks (e.g., via the LTE network and the WLAN), and proxy server 270 may de-multiplex the traffic and provide the de-multiplexed traffic to application server 275 as the single logical traffic flow.

While shown in FIG. 2 as connected to PDN 260, network management server 265, proxy server 270, and/or application server 275 may be communicatively coupled to one or more other devices and/or networks. For example, in some implementations, network management server 265 may be connected to base station 210, MLS 220, SGW 225, PGW 230, and/or gateway 255 via a direct connection and/or via a network other than PDN 260. As another example, in some implementations, proxy server 270 may be connected to PGW 230, gateway 255, and/or application server 275 via a direct connection and/or via a network other than PDN 260.

FIG. 3 illustrates another example environment 300, in which systems and/or methods described herein may be implemented. Portions of environment 300 may correspond to portions of environment 200. For example, networks 305-1 and 305-2 (sometimes hereinafter referred to individually as "network 305," or collectively as "networks 305") may each include one or more components shown in FIG. 2. For example, network 305-1 may include a set of base stations 210, SGWs 225, PGWs 230, etc., while network 305-2 may include WLAN AP 250 and gateway 255. In this sense, network 305-1 may be referred to as a "cellular network," and network 305-2 may be referred to as a "WLAN" or a "Wi-Fi network." In some implementations, networks 305 may be associated with the same service provider (e.g., wireless telecommunications providers, or "carriers").

As shown, networks 305 may each maintain a particular network management server 265 (e.g., network management server 265-1 may be associated with network 305-1, while network management server 265-2 may be associated with network 305-2). network management server 265-1 may, for example receive and/or determine KPI information associated with network 305-1, while network management server 265-2 may receive and/or determine KPI information associated with network 305-2. For instance, network management server 265-1 may monitor data packets sent and/or received by one or more network devices associated with network 305-1 in order to determine KPIs associated with network 305-1 (e.g., packet loss rate, round trip latency, one-way latency, throughput, jitter, etc.). network management server 265-1 and network management server 265-2 may provide the KPI information to network management server 265-3, which may allow network management server 265-3 to maintain a high-level and/or a granular view of KPIs associated with both networks 305-1 and 305-2. As described below, the KPI information, associated with both networks 305-1 and 305-2 may be useful in order to allow user device 205 to determine how traffic should be multiplexed over networks 305-1 and 305-2. Additionally, a hierarchical arrangement of network management servers 265, as shown in FIG. 3, may be useful in implementations where networks 305-1 and 305-2 are owned and/or operated by different entities, and/or in situations where direct communication between network 305-1 and network 305-2 is unfeasible or is not cost effective.

The quantity of devices and/or networks, illustrated in FIGS. 2 and 3, is provided for explanatory purposes only. In practice, there may be additional devices and/or networks; fewer devices and/or networks; different devices and/or networks; or differently arranged devices and/or networks than illustrated in FIGS. 2 and/or 3. Alternatively, or additionally, one or more of the devices of environment 200 and/or 300 may perform one or more functions described as being performed by another one or more of the devices of environments 200 and/or 300. Devices of environments 200 and/or 300 may interconnect via wired connections, wireless connections, or a combination of wired and wireless connections.

Figure 4:
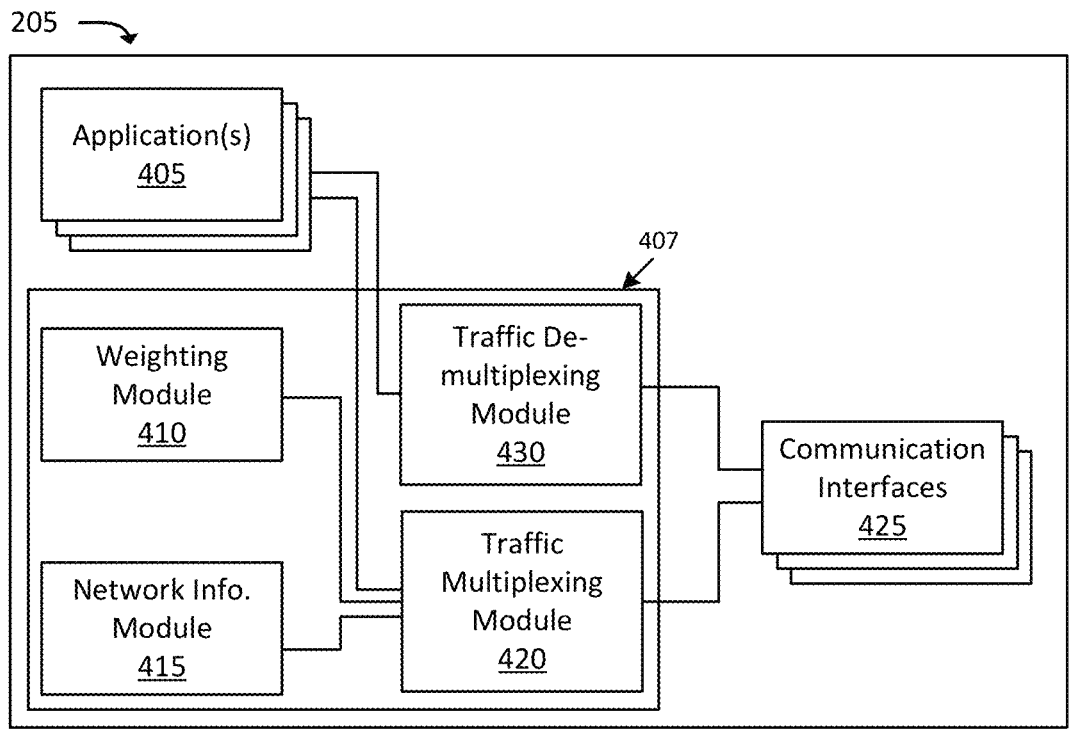
FIG. 4 illustrates example functional components of a user device, in accordance with one or more implementations.

FIG. 4 illustrates example functional components of user device 205, in accordance with some implementations. As shown, user device 205 may include one or more applications 405, as well as traffic agent 407. Traffic agent 407 may include weighting module 410, network information module 415, traffic multiplexing module 420, and traffic de-multiplexing module 430. As further shown, user device 205 may include a set of communication interfaces 425.

Application(s) 405 may include one or more applications that send and/or receive traffic (e.g., to and/or from one or more application servers 275). For instance, application(s) 405 may include a voice call application, a video conferencing application, a text messaging application, a gaming application, and/or another type of application. A particular application 405 may, for example, output traffic as a set of IP data packets, with an IP address of a particular application server 475 indicated as a destination of the IP data packets.

Traffic agent 407 may receive, or "intercept," traffic from application(s) 405, and may multiplex the traffic, on a per-application basis, based on conditions associated with various networks and based on characteristics of the corresponding application(s) 405. As mentioned above, traffic agent 407 may include weighting module 410, network information module 415, and traffic multiplexing module 420, which may facilitate the multiplexing, as described below. Traffic agent 407 may also receive multiplexed traffic, intended for one or more applications 405, and may de-multiplex the traffic, as described below. While traffic agent 407 is described, with respect to FIG. 4, as being incorporated as part of user device 205, in some implementations, some or all of the operations, performed by traffic agent 407, may be performed by a device external to traffic agent 407. Further, one or more other devices (e.g., proxy server 270) may include traffic agent 407 and/or a similar set of components.

For example, weighting module 410 may receive and/or store weighting information for multiple applications 405. The weighting information, for a particular application 405, may generally correspond to particular KPIs that are relevant to providing a high QoE for the particular application 405. For example, a "real-time" application, such as a voice call application, may have low throughput requirements for a high QoE, while low latency and loss rate may be relatively important in order to provide a high QoE. As another example, a file transfer application may have a high throughput requirement in order to provide a high QoE, while latency and loss rate may be less important. As yet another example, different portions of a layered video stream may have different QoE requirements. A "layered video stream" may refer to a stream in which lower layers of a video stream must be received in order for higher layers to be decoded. In some implementations, lower layers may require low latency and/or loss rate for a high QoE, while higher layers may favor a high throughput.

Referring to the above examples, weighting module 410 may store three different weights for each particular application 405, where each weight corresponds to a different one of the example KPIs mentioned above. Assume, for instance, that for a first application 405-1, weighting module 410 stores a first weight $w_{tp1}$, which may correspond to the impact of throughput on the QoE provided by the first application 405-1, a second weight $w_{pl1}$ which may correspond to the impact of packet loss on the QoE, and a third weight $w_{l1}$, which may correspond to the impact of latency on the QoE. For a second application 405-2, weighting module 410 may store a first weight $w_{tp2}$, which may correspond to the impact of throughput on the QoE provided by the second application 405-2, a second weight $w_{pl2}$, which may correspond to the impact of packet loss on the QoE, and a third weight $w_{l2}$, which may correspond to the impact of latency on the QoE.

The weights, stored by weighting module 410, may be received from an application developer and/or vendor associated with application 405, a service provider and/or administrator associated with user device 205 (e.g., a telecommunications service provider that provides cellular service to user device 205), and/or from another source. In some implementations, a third party data repository and/or some other device may store information associating applications, or application types, with weights.

Network information module 415 may receive, determine, and/or store information regarding KPIs associated with a set of networks (e.g., a cellular network and a WLAN). For example, network information module 415 may receive the KPI information from an external source (e.g., from network management server 265). As another example, network information module 415 may generate KPI information by monitoring data sent and/or received by user device 205, and/or network information module 415 may output test packets and may measure KPI information based on metrics associated with the test packets (e.g., uplink throughput of the test packets, round trip delay time, etc.).

In some implementations, network information module 415 may normalize the KPI information, and may store the raw KPI information and/or the normalized information. For instance, network information module 415 may normalize the KPI information on a predetermined scale (e.g., between 1 and 100, between 0 and 1, etc.). Assume, for instance, that network information module 415 normalizes KPI information on a 1-100 scale, with 100 being considered the more "favorable" end of the scale (e.g., lower latency, lower packet loss rate, higher throughput, etc.). Network information module 415 may, for instance, normalize measures of throughput, in a linear fashion, between 1 kilobit per second ("kbps") and 30 megabytes per second ("MBps"). Thus, a network that exhibits a throughput of 1 kbps would be associated with a normalized KPI value of 1, while a throughput of 15 MBps would be associated with a normalized KPI value of approximately 50, and 30 MBps would be associated with a normalized KPI value of 100. In some implementations, raw values above or below the scale may be normalized to the maximum or the minimum values, respectively, of the scale. For instance, a throughput of 0.5 kbps may be associated with a normalized KPI value of 1, while a throughput of 35 MBps may be associated with a normalized KPI value of 100. In other implementations, the raw values may normalized to values outside of the predetermined scale.

In some implementations, the scale may be a logarithmic and/or otherwise non-linear scale. For example, according to a non-linear scale, a network that exhibits a throughput of 1kbps may be associated with a normalized KPI value of 1, while a throughput of 15 MBps may be associated with a normalized KPI value of approximately 90, and a throughput of 30 MBps may be associated with a normalized KPI value of 92.

While examples of normalization techniques are described above, in practice, different techniques, or no techniques, for normalization may be used. The various factors associated with the normalizing (e.g., scale ranges, whether a scale is linear or non-linear, etc.) may be set and/or modified by an administrator. In some implementations, the factors may be automatically generated and/or modified. For instance, if network information module 415 determines that raw KPI values often fall outside of the predetermined scale, network information module 415 may adjust the scale based on the raw KPI values. As another example, if network information module 415 determines that portions of the scale are unused, network information module 415 may adjust the scale. For example assume that network information module 415 determines that normalized KPI values are typically between 50 and 60. Network information module 415 may adjust the scale such that the previous normalized values of 50 may now be normalized to 1, while the previous normalized values of 60 may now be normalized to 100.

Traffic multiplexing module 420 may determine scores for various networks, on a per-application basis, based on the weights stored by weighting module 410 and the KPI information stored by network information module 415, and may multiplex traffic, associated with applications 405, based on the scores. For example, assume that weighting module 410 stores weight values for two applications 405-1 and 405-2, and that network information module 415 stores normalized KPI information for two networks 305-1 and 305-2. For example, assume that the normalized KPI information relates to throughput ("TP"), packet loss ("PL"), and latency ("L"). As used herein, the variables TP1, PL1, and L1 may refer to normalized KPI information for network 305-1, while the variables TP2, PL2, and L2 may refer to normalized KPI information for network 305-2.

For application 405-1, traffic multiplexing module 420 may generate a score ("S") for each network 305. As used herein, the variable S1 may refer to the generated score for network 305-1, with respect to application 405-1, while the variable S2 may refer to the generated score for network 305-2, with respect to application 405-1. Referring to the above examples, discussed above with respect to weighting module 410, these scores may calculated as shown in the following equations:

$$S1 = TP1 * w_{tp1} + PL1 * w_{pl1} + L1 * w_{l1} \qquad \text{(Equation 1)}$$

$$S2 = TP2 * w_{tp1} + PL2 * w_{pl1} + L2 * w_{l1} \qquad \text{(Equation 2)}$$

Additionally, for application 405-2, traffic multiplexing module 420 may generate another score for each network 305. The variable S3 may refer to the generated score for network 305-1, with respect to application 405-2, while the variable S4 may refer to the generated score for network 305-2, with respect to application 405-2. Referring to the above examples, discussed above with respect to weighting module 410, these scores may calculated as shown in the following equations:

$$S3 = TP1 * w_{tp2} + PL1 * w_{pl2} + L1 * w_{l2} \qquad \text{(Equation 3)}$$

$$S4 = TP2 * w_{tp2} + PL2 * w_{pl2} + L2 * w_{l2} \qquad \text{(Equation 4)}$$

While example equations are shown above, in practice, traffic multiplexing module 420 may determine scores, associated with networks 305, in a manner different from that described above. For example, additional weights may be assigned to one or more KPIs (e.g., weights that are not based on the particular application 405, for which the score is being calculated). The following equation illustrates an example of a network score S5 being calculated based on non-application-specific weights a, b, and c being applied:

$$S5 = a * TR1 * w_{tp}1 + b * PL1 * w_{pl1} + c * L1 * w_{l1} \qquad \text{(Equation 5)}$$

Further, while example KPIs are discussed above, in practice, additional, fewer, and/or different KPIs may be used to determine scores associated with networks 305.

Traffic multiplexing module 420 may use the scores to determine how to multiplex traffic, associated with each application, over networks 305-1 and 305-2. For example, assume that the value of score S1 is 3.0 and the value of score S2 is 1.0. Traffic multiplexing module 420 may determine that 75% of the traffic, associated with application 405-1, should be outputted via network 305-1, and that 25% of the traffic, associated with application 405-1, should be outputted via network 305-2. In some implementations, traffic multiplexing module 420 may determine that traffic, associated with application 405-1, should be outputted over network 305-1 and not over network 305-2, since the value of score S1 is higher than the value of score S2.

In some implementations, traffic multiplexing module 420 may additionally, or alternatively, multiplex traffic based on the type of application 405. For example, if application 405 is a file transfer application, it may be desirable to utilize as much throughput as possible (e.g., as much throughput of each of networks 305-1 and 305-2 as possible). In some such implementations, throughput may be weighted more heavily than packet loss and/or latency.

As mentioned above, in some implementations, some applications 405 may have different weights for different types of traffic. For example, a layered video streaming application may have different weights w for different layers of video. For example, a latency weight $w_l$ for a lower layer portion of the video stream may be higher than a latency weight $w_l$ for a higher layer portion of the video stream, and a throughput weight $w_{tp}$ for a higher layer portion of the video stream may be higher than a throughput weight $w_{tp}$ for a lower layer portion of the video stream.

Traffic multiplexing module 420 may output the multiplexed traffic via a set of communication interfaces 425, associated with user device 205. Connection interfaces 425 may include logic and/or circuitry to output the traffic via various networks 305. For example, a first connection interface 425 may include a Wi-Fi radio transceiver, while a second connection interface 425 may include an LTE radio transceiver. When outputting the multiplexed traffic, traffic multiplexing module 420 may add information, which may allow proxy server 270 to subsequently de-multiplex the traffic. For example, traffic multiplexing module 420 may add header information (e.g., IP header information) to the traffic. The added header information may identify that a destination of the multiplexed traffic is proxy server 270. The added header information may include additional information that may be used by proxy server 270, such as an identifier associated with user device 205 (e.g., an IP address of user device 205, a mobile directory number ("MDN"), an International Mobile Subscriber Identity ("IMSI"), an International Mobile Station Equipment Identity ("IMEI"), and/or another identifier), a multiplexing score associated with the traffic (e.g., score S1 and/or score S2), and/or other information. As described below, proxy server 270 may strip the additional header information from the traffic, may reconstruct (e.g., de-multiplex) the original traffic flow (e.g., as outputted by application 405) based on the additional header information, and route the original traffic flow to application server 275 (e.g., based on header information associated with the original traffic flow).

In this sense, application 405 and/or application server 275 may be "unaware" of the multiplexing and de-multiplexing. For instance, application 405 may output IP packets "as normal" toward application server 275, and application server 275 may output IP packets "as normal" toward application 405. That is, for example, while application 405 may indicate that application server 275 is an intended recipient of traffic, traffic multiplexing module 420 may intercept the traffic, add information to the traffic, etc., in order to perform the multiplexing as described herein.

In some implementations, in addition to, or in lieu of KPIs, traffic multiplexing module 420 may multiplex traffic based on additional information. For example, traffic multiplexing module 420 may receive additional information from network management server 265. Based on the additional information, traffic multiplexing module 420 may score networks differently. For example, traffic multiplexing module 420 may receive a coefficient from network management server 265, and/or may generate a coefficient based on information received from network management server 265, based on which traffic multiplexing module 420 may generate or modify a network score. For instance, the coefficient may be based on a location at which user device 205 is presently located, and/or a predicted location at which user device 205 is likely to be located (e.g., at a future time). For example, for two different networks 305-1 and 305-2, traffic multiplexing module 420 may receive two different coefficients x and y, respectively. The following equations illustrate example of network scores S6 and S7 being calculated, for example user device 405-1, based on the received coefficients:

$S6 = x*(TP1*w_{tp1} + PL1*w_{pl1} + L1*w_{l1})$ (Equation 6)

$S7 = y*(TP2*w_{tp1} + PL2*w_{pl1} + L2*w_{i1})$ (Equation 7)

These coefficients may be related to, for example, network conditions associated with networks 305-1 and 305-2. For instance, a cellular network may become congested, and a network service provider may prefer that more traffic be sent over Wi-Fi networks than the cellular network. In this situation, the coefficient for the cellular network may be lowered, and/or the coefficient for the Wi-Fi network may be raised.

As another example, traffic multiplexing module 420 may receive KPI information for another location within network 305-2, at which user device 205 is likely to be located at a future time. As described below, traffic multiplexing module 420 may receive this KPI information from network management server 265, which may predict a future location of user device 205 based on various factors. Such a scenario may occur when network 305-2 is a cellular network, at which different cells provide different levels of performance. For example, a cell, at a first location, may be relatively congested, while another cell, at a second location, may be less congested.

Traffic multiplexing module 420 may receive (and may, in some implementations, normalize) KPI information (e.g., throughput information, packet loss information, and latency information (TP2', PL2', and L2')) for the other location of network 305-2. In some implementations, the network score for network 305-2 may be based on the KPI information for both the present location and the predicted future location of user device 205, within network 305-2. For example, the following equation illustrates an example network score S8 that may be based on multiple locations within network 305-2:

$S8 = (TP2*w_{tp1} + PL2*w_{pl1} + L2*w_{l1} + TP2'*w_{tp1} + PL2'*w_{pl1} + L2'*w_{l1})/2$ (Equation 8)

While example equations (i.e., Equations 1-8) were described above, in practice, network scores may be calculated in other ways. For example, network scores may be calculated based on KPIs in addition to, or in lieu of, the KPIs mentioned above. As another example, while Equation 8 was described as being an average of KPIs of two locations associated with a particular network 305, in some implementations, a network score may be calculated based on a weighted average of KPIs associated with two or more locations associated with a particular network 305. The weight may, for instance, be based on a distance between a present location of user device 205 from a reference point associated with a particular location (e.g., a cellular tower) of network 305, and or a trajectory of user device 205 with respect to the reference point. For example, a higher weight may be assigned when user device 205 is near the reference point, and/or when user device 205 is approaching the reference point (which may be determined based on the trajectory of user device 205).

Traffic de-multiplexing module 430 may receive multiplexed traffic (e.g., via multiple communication interfaces 425), and may de-multiplex the traffic. For example, the multiplexed traffic may be received from a particular application server 275, and may have been multiplexed by proxy server 270. In some implementations, proxy server 270 may have performed similar operations as described above with respect to traffic multiplexing module 420, in order to multiplex the traffic. For example, traffic multiplexing module 420 may have identified network scores, associated with multiple networks 305, and outputted the traffic, in a multiplexed fashion based on the network scores, to user device 205, via the multiple networks 305. As also described above, the traffic may include additional information, which traffic de-multiplexing module 430 may use to de-multiplex the traffic (e.g., an identification of a particular application 405 with which the traffic is associated, a packet sequence number, etc.). Traffic de-multiplexing module 430 may de-multiplex the traffic in order to reconstruct an original logical traffic flow, and provide the original logical traffic flow to application 405.

Figure 5:
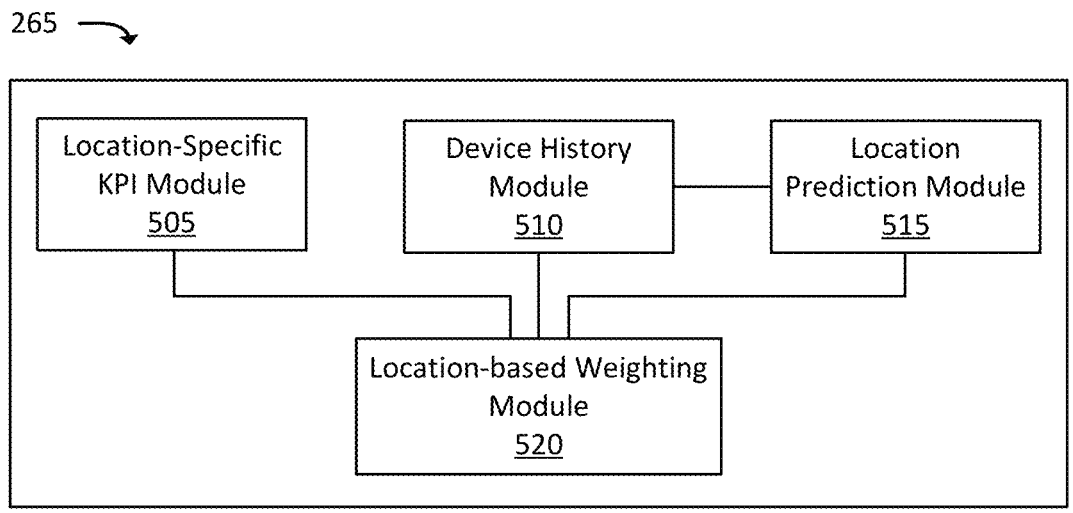
FIG. 5 illustrates example functional components of a network management server, in accordance with one or more implementations.

FIG. 5 illustrates example functional components of network management server 265, in accordance with some implementations. As shown, network management server 265 may include location-specific KPI module 505, device history module 510, location prediction module 515, and location-based weighting module 520.

Figure 6:
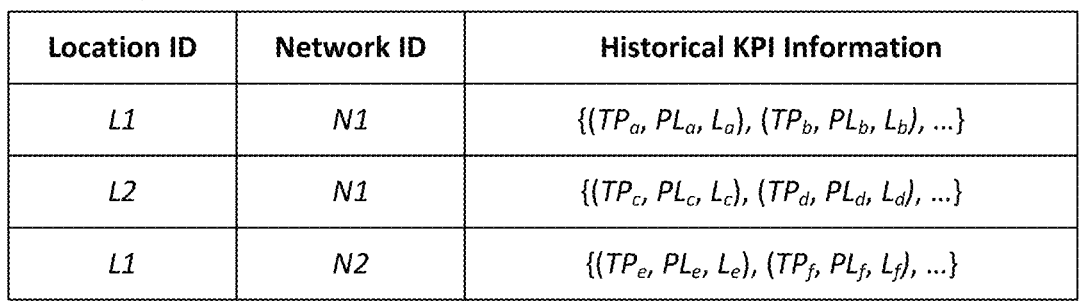
FIG. 6 illustrates an example data structure, which may correspond to location-specific key performance indicator ("KPI") information.

Location-specific KPI module 505 may receive and/or store KPI information on a per-location basis. For example, as mentioned above, a particular network may have different KPIs for different locations. This situation may occur when the particular network is a cellular network, and the different locations may correspond to different cells of the network. FIG. 6 illustrates an example data structure 600, which may be stored by location-specific KPI module 505. As shown, data structure 600 may include location identifier ("ID") fields, network ID fields, and historical KPI information.

The location ID field may store information regarding a location, for which KPI information may be stored. Example location information may include a cell identifier (e.g., an identifier of a cell associated with a cellular network), an access point identifier (e.g., an access point of a WLAN), latitude and longitude coordinates, an address, and/or other information identifying a geographic location or region. The network ID field may store information regarding a network, for which KPI information may be stored. For example, the information may include an identifier of a network (e.g., an identifier of a cellular network and/or another network, such as a land-based network).

The historical KPI information may include KPIs for a particular network, and a particular location, over time. For example, as shown, location L1 of network N1 may be associated with sets of KPIs at times (or time ranges) a and b (i.e., $TP_a$, $PL_a$, and $L_a$ at time a; and $TP_b$, $PL_b$, and $L_b$ at time b). For example, each set of KPIs may correspond to KPIs measured or calculated at a particular time, or over a period of time (e.g., over one second, over one minute, over one hour, etc.).

Returning to FIG. 5, device history module 510 may store information regarding user devices 205. For example, the information may indicate locations at which user devices 205 have been located in the past. The information, stored by device history module 510, may be used by location prediction module 515 to predict (or attempt to predict) where a particular user device 205 may be located in the future, bases on past trends. For example, if a user typically works at an office during the weekdays and/or drives a particular route during particular times of day, it may be inferred that the user's user device 205 may generally follow the identified pattern.

Location-based weighting module 520 may generate weights for locations, based on the information stored by location-specific KPI module 505 and device history module 510 and location predictions determined by location prediction module 515. For example, a weight, generated by location-based weighting module 520, may be based on the likelihood that a particular user device 205 will be located at a predicted location. For example, if location prediction module 515 determines, with a relatively high confidence, that a particular user device 205 will be located at a particular location, location-based weighting module 520 may generate a relatively high weight for the location. Location-based weighting module 520 may provide the weight to traffic multiplexing module 420, which may use the weight when determining how to multiplex traffic. For example, as discussed above, traffic multiplexing module 420 may generate a network score based on multiple locations associated with a particular network. If a weight for a particular predicted location is higher than a weight associated with a present location of user device 205, the network score may be more heavily based on the predicted location than the present location.

Figure 7:
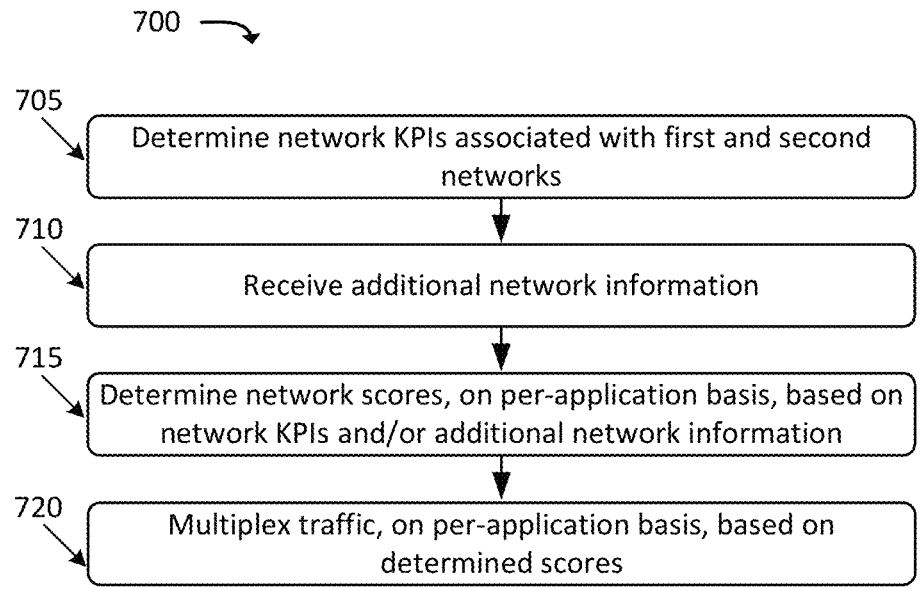
FIG. 7 illustrates an example process for multiplexing traffic, on a per-application basis, which may be performed by a user device in one or more implementations.

FIG. 7 illustrates an example process 700 for multiplexing traffic on a per-application basis. In some implementations, some or all of process 700 may be performed by traffic agent 407. For example, user device 205 and/or PDN 260 may perform some or all of process 700. For example, user device 205 may multiplex traffic from one or more applications associated with user device 205, while PDN 260 may multiplex traffic from one or more application servers 275.

Process 700 may include determining (at 705) KPIs associated with first and second networks. For example, as discussed above with respect to network information module 415, traffic agent 407 may receive and/or determine KPIs associated with a set of networks (e.g., a cellular network and a Wi-Fi network).

Process 700 may also include receiving (at 710) additional network information. For example, as described above, traffic agent 407 may receive additional information, based on which traffic multiplexing module 420 may score networks. The additional information may include weights for networks and/or locations of networks, and may be received from network management server 265 and/or another source.

Process 700 may further include determining (at 715) network scores, on a per-application basis, based on the received KPIs and/or additional network information. For example, as described above with respect to traffic multiplexing module 420, traffic agent 407 may generate one or more scores for each of a set of networks. The network scores may, in some instances, correspond to particular locations associated with networks. When determining (at 715) the network scores, traffic agent 407 may determine the network scores on a per-application basis (e.g., one set of network scores per application, associated with user device 205, that sends and/or receives traffic; and/or one set of network scores per application server 275, that sends and/or receives traffic to and/or from PDN 260).

Process 700 may additionally include multiplexing (at 720) traffic, on a per-application basis, based on the determined scores. For example, as discussed above with respect to traffic multiplexing module 420, traffic agent 407 may output the traffic via multiple networks (e.g., a Wi-Fi network and a cellular network). The relative value of the network scores, for a particular application, may be used to determine the proportion of traffic, for the particular application, that is sent over each network. Traffic multiplexing module 420 may, for instance, add information to the traffic, which may allow the traffic to be de-multiplexed by a recipient of the multiplexed traffic. The added information may include, for example, a wrapper and/or other information indicating that the traffic should be sent to proxy server 270. For instance, the added information may include an IP address and/or another identifier associated with proxy server 270.

As described above with respect to traffic de-multiplexing module 430, a recipient of the traffic (e.g., proxy server 270) may "strip" the additional information from the traffic (outputted, at 720, via multiple networks). For instance, proxy server 270 may remove the additional information added by traffic multiplexing module 420, and may reconstruct the original traffic flow (e.g., as outputted by application 405). Proxy server may forward the original traffic flow to a recipient indicated in the original traffic flow (e.g., application server 275). In this sense, the operation of traffic multiplexing module 420 and proxy server 270 may be "invisible" to application 405 and/or application server 275.

Figure 8:
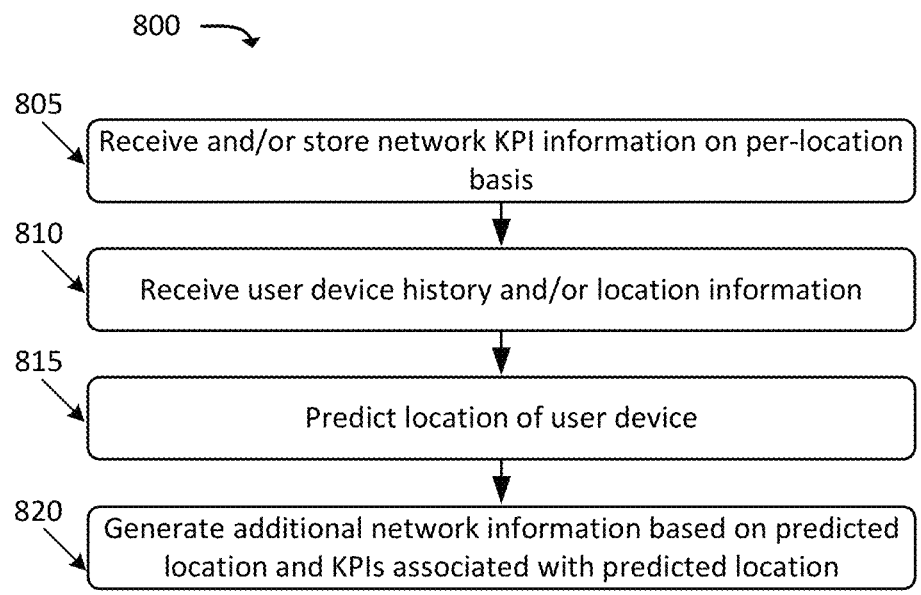
FIG. 8 illustrates an example process for generating additional network information, based on a predicted location of a user device, which may be used by the user device when multiplexing traffic.

FIG. 8 illustrates an example process 800 for generating additional information, based on a predicted location of a user device. In some implementation, process 800 may be performed by network management server 265. In other implementations, some or all of process 800 may be performed by one or more other devices in addition to, or in lieu of, network management server 265.

Process 800 may include receiving and/or storing (at 805) network KPI information on a per-location basis. For example, as described above with respect to location-specific KPI module 505 and data structure 600, network management server 265 may store KPI information (e.g., KPI information over time) associated with multiple locations, such as cells of a cellular network, access points of a WLAN, etc.

Process 800 may also include receiving (at 810) user device history and/or location information. For example, as discussed above with respect to device history module 510, network management server 265 may receive information indicating locations associated with user device 205. The user device history information may aid in the identification of trends associated with user device 205.

Process 800 may further include predicting (at 815) a location of the user device. For example, as discussed above with respect to location prediction module 515, network management server 265 may predict a location of user device 205, based on the information received and/or stored by device history module 510.

Process 800 may additionally include generating (at 820) additional network information based on the predicted location and KPIs associated with the predicted location. For instance, as discussed above with respect to location-based weighting module 520, network management server 265 may generate a weight and/or other information, associated with the network, based on the KPIs associated with the predicted location of user device 205. This information may be provided to, for example, traffic multiplexing module 420, which may generate a network based on the additional network information (provided by location-based weighting module 520) and/or other information.

Figure 9:
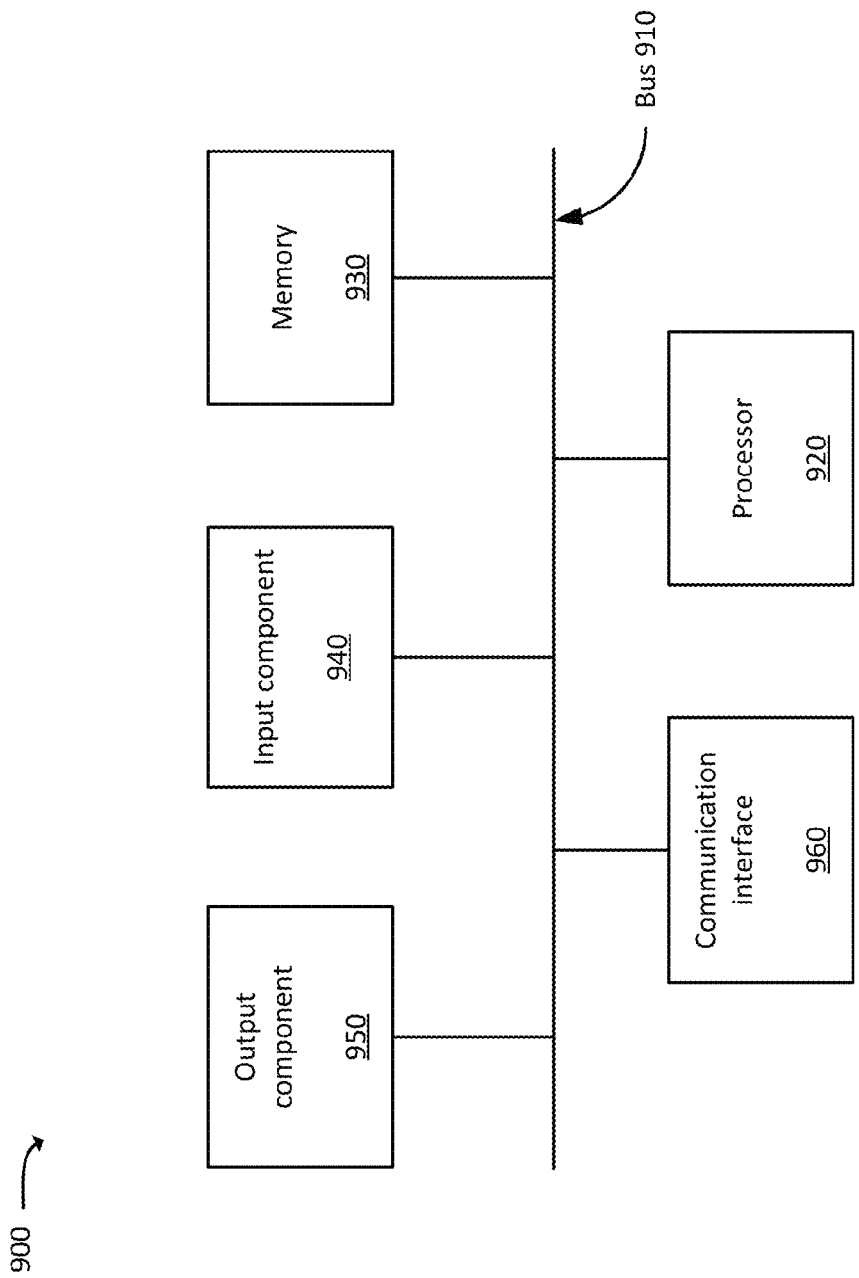
FIG. 9 illustrates example components of a device, in accordance with some implementations described herein.

FIG. 9 is a diagram of example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while certain KPIs have been discussed above (e.g., latency, throughput, and packet loss), in practice, additional, fewer, or different KPIs may be used.

As another example, while an example data structure is illustrated in FIG. 6 as including certain types of information, in practice, these data structures may store additional, fewer, different, or differently arranged types of information than shown in these figures. Furthermore, while these data structures are shown as tables, in practice, these data structures may take the form of any other type of data structure, such as an array, a linked list, a hash table, a tree, and/or any other type of data structure. Additionally, while series of blocks have been described with regard to FIGS. 7 and 8, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
   determining, by a device, a first set of key performance indicators ("KPIs") associated with a first network;
   determining, by the device, a second set of KPIs associated with a second network, the second network being different from the first network;
   generating, by the device, a set of scores associated with the first and second networks and further associated with first and second applications, the set of scores including:
      a first score, for the first network and the first application, based on the first set of KPIs and a first set of weights, the first set of weights being associated with the first application,
      a second score, for the first network and the second application, based on the first set of KPIs and a second set of weights, the second set of weights being associated with the second application,
      a third score, for the second network and the first application, based on the second set of KPIs and the first set of weights, and
      a fourth score, for the second network and the second application, based on the second set of KPIs and the second set of weights;
   determining, by the device and based on the first score and the third score, a manner in which to output traffic, associated with the first application, over the first network and the second network; and
   determining, by the device and based on the second score and the fourth score, a manner in which to output traffic, associated with the second application, over the first network and the second network.

2. The method of claim 1, wherein a particular set of KPIs, of the first and second sets of KPIs, includes at least one of:
   latency,
   throughput, or
   packet loss.

3. The method of claim 1, further comprising:
   receiving a logical traffic flow from the first application;
   generating a first traffic flow and a second traffic flow based on the logical traffic flow;
   outputting the first traffic flow via the first network; and
   outputting the second traffic flow via the second network.

4. The method of claim 3, wherein generating the first and second traffic flows includes:
   adding information, to the first and second traffic flows, that allows the logical traffic flow to be reconstructed, from the first and second traffic flows, by a device that receives the first and second traffic flows.

5. The method of claim 1, wherein determining the manner in which to output traffic, associated with the first application, over the first network and the second network, includes:
   determining a first proportion of the traffic, associated with the first application, to output via the first network, and
   determining a second proportion of the traffic, associated with the first application, to output via the second network.

6. The method of claim 1, wherein the device includes a user device.

7. The method of claim 1, further comprising:
   receiving additional weighting information regarding at least one of:
      the first network, or
      the second network,
   wherein generating the set of scores is further based on the additional weighting information.

8. The method of claim 1, wherein generating the set of scores is further based on a present location of the device.

9. A device, comprising:
   a memory device storing a set of processor-executable instructions; and
   a processor configured to execute the processor-executable instructions, wherein executing the computer-executable instructions causes the processor to:
      determine a first set of key performance indicators ("KPIs") associated with a first network;
      determine a second set of KPIs associated with a second network, the second network being different from the first network;
      generate a set of scores associated with the first and second networks and further associated with first and second applications, the set of scores including:
         a first score, for the first network and the first application, based on the first set of KPIs and a first set of weights, the first set of weights being associated with the first application,
         a second score, for the first network and the second application, based on the first set of KPIs and a second set of weights, the second set of weights being associated with the second application, a third score, for the second network and the first application, based on the second set of KPIs and the first set of weights, and a fourth score, for the second network and the second application, based on the second set of KPIs and the second set of weights;

determine, based on the first score and the third score, a manner in which to output traffic, associated with the first application, over the first network and the second network; and determine, based on the second score and the fourth score, a manner in which to output traffic, associated with the second application, over the first network and the second network.

10. The device of claim 9, wherein a particular set of KPIs, of the first and second sets of KPIs, includes at least one of:
latency,
throughput, or
packet loss.

11. The device of claim 9, wherein executing the processor-executable instructions further causes the processor to:
generate a first traffic flow and a second traffic flow based on a logical traffic flow received from an application;
output the first traffic flow via the first network; and
output the second traffic flow via the second network.

12. The device of claim 11, wherein executing the processor-executable instructions, to generate the first and second traffic flows, further causes the processor to:
add information, to the first and second traffic flows, that allows the logical traffic flow to be reconstructed, from the first and second traffic flows, by a device that receives the first and second traffic flows.

13. The device of claim 9, wherein executing the processor-executable instructions, to determine the manner in which to output traffic, associated with the first application, over the first network and the second network, further causes the processor to:
determine a first proportion of the traffic, associated with the first application, to output via the first network, and
determine a second proportion of the traffic, associated with the first application, to output via the second network.

14. The device of claim 9, wherein the first network includes a cellular network, and wherein the second network includes a Wi-Fi network.

15. The device of claim 9, wherein executing the processor-executable instructions further causes the processor to:
receive additional weighting information regarding at least one of:
the first network, or
the second network,
wherein the set of scores is further based on the additional weighting information.

16. The device of claim 9, wherein the set of scores is further based on a present location of the device.

17. A non-transitory computer-readable medium, storing a set of processor-executable instructions, which, when executed, cause a processor to:
determine a first set of key performance indicators ("KPIs") associated with a first network;
determine a second set of KPIs associated with a second network, the second network being different from the first network;
generate a set of scores associated with the first and second networks and further associated with first and second applications, the set of scores including:
a first score, for the first network and the first application, based on the first set of KPIs and a first set of weights, the first set of weights being associated with the first application,
a second score, for the first network and the second application, based on the first set of KPIs and a second set of weights, the second set of weights being associated with the second application,
a third score, for the second network and the first application, based on the second set of KPIs and the first set of weights, and
a fourth score, for the second network and the second application, based on the second set of KPIs and the second set of weights;
determine, based on the first score and the third score, a manner in which to output traffic, associated with the first application, over the first network and the second network; and
determine, based on the second score and the fourth score, a manner in which to output traffic, associated with the second application, over the first network and the second network.

18. The non-transitory computer-readable medium of claim 17, wherein a particular set of KPIs, of the first and second sets of KPIs, includes at least one of:
latency,
throughput, or
packet loss.

19. The non-transitory computer-readable medium of claim 17, wherein the processor-executable instructions further include processor-executable instructions to:
generate a first traffic flow and a second traffic flow based on a logical traffic flow received from an application;
output the first traffic flow via the first network; and
output the second traffic flow via the second network.

20. The non-transitory computer-readable medium of claim 19, wherein the processor-executable instructions, to generate the first and second traffic flows, further include processor-executable instructions to:
add information, to the first and second traffic flows, that allows the logical traffic flow to be reconstructed, from the first and second traffic flows, by a device that receives the first and second traffic flows.

* * * * *